United States Patent
Wehnes et al.

(10) Patent No.: US 9,262,822 B2
(45) Date of Patent: Feb. 16, 2016

(54) MALIGNANT MASS DETECTION AND CLASSIFICATION IN RADIOGRAPHIC IMAGES

(75) Inventors: Jeffrey C. Wehnes, Richardson, TX (US); James H. Pike, Carrollton, TX (US)

(73) Assignee: VUCOMP, INC., Plano, TX (US)

( * ) Notice: Subject to any disclaimer, the term of this patent is extended or adjusted under 35 U.S.C. 154(b) by 141 days.

(21) Appl. No.: 13/695,357

(22) PCT Filed: Apr. 29, 2011

(86) PCT No.: PCT/US2011/034698
§ 371 (c)(1),
(2), (4) Date: Nov. 26, 2012

(87) PCT Pub. No.: WO2011/137409
PCT Pub. Date: Nov. 3, 2011

(65) Prior Publication Data
US 2013/0202165 A1    Aug. 8, 2013

Related U.S. Application Data

(60) Provisional application No. 61/400,573, filed on Jul. 28, 2010, provisional application No. 61/343,557, filed on Apr. 30, 2010, provisional application No. 61/343,552, filed on May 2, 2010, provisional (Continued)

(51) Int. Cl.
*G06T 7/00* (2006.01)
*G06T 5/10* (2006.01)
(Continued)

(52) U.S. Cl.
CPC ............ *G06T 7/0012* (2013.01); *G06K 9/6267* (2013.01); *G06T 5/002* (2013.01);
(Continued)

(58) Field of Classification Search
CPC ... G06T 7/0012; G06T 7/0081; G06T 7/0087; G06T 5/10; G06T 5/002; G06T 2207/10116; G06T 2207/20016; G06T 2207/30068; G06T 2207/30096; G06K 9/6267
See application file for complete search history.

(56) References Cited

U.S. PATENT DOCUMENTS

| 4,907,156 A | 3/1990 | Doi et al. |
| 5,109,430 A | 4/1992 | Nishihara et al. |

(Continued)

FOREIGN PATENT DOCUMENTS

| JP | 2004105729 A | 4/2004 |
| JP | 2005080758 A | 3/2005 |

(Continued)

OTHER PUBLICATIONS

"CheckMate™ Ultra with PeerView™ Feature," Product Brochure, R2 Technology, Inc., circa 2002.

(Continued)

*Primary Examiner* — Katrina Fujita
(74) *Attorney, Agent, or Firm* — Slater & Matsil, LLP

(57) ABSTRACT

An image analysis embodiment comprises subsampling a digital image by a subsample factor related to a first anomaly size scale, thereby generating a subsampled image, smoothing the subsampled image to generate a smoothed image, determining a minimum negative second derivative for each pixel in the smoothed image, determining each pixel having a convex down curvature based on a negative minimum negative second derivative value for the respective pixel, joining each eight-neighbor connected pixels having convex down curvature to identify each initial anomaly area, selecting the initial anomaly areas having strongest convex down curvatures based on a respective maximum negative second derivative for each of the initial anomaly areas, extracting one or more classification features for each selected anomaly area, and classifying the selected anomaly areas based on the extracted one or more classification features.

24 Claims, 11 Drawing Sheets

Related U.S. Application Data application No. 61/343,608, filed on May 2, 2010, provisional application No. 61/343,609, filed on May 2, 2010, provisional application No. 61/395,029, filed on May 6, 2010, provisional application No. 61/398,571, filed on Jun. 25, 2010, provisional application No. 61/399,094, filed on Jul. 7, 2010.

(51) Int. Cl.
  *G06T 5/00* (2006.01)
  *G06K 9/62* (2006.01)

(52) U.S. Cl.
  CPC ............ *G06T 5/10* (2013.01); *G06T 7/0081* (2013.01); *G06T 7/0087* (2013.01); *G06T 2207/10116* (2013.01); *G06T 2207/20016* (2013.01); *G06T 2207/30068* (2013.01); *G06T 2207/30096* (2013.01)

(56) References Cited

U.S. PATENT DOCUMENTS

| | | | |
|---|---|---|---|
| 5,133,020 A | | 7/1992 | Giger et al. |
| 5,301,129 A | | 4/1994 | McKaughan et al. |
| 5,359,513 A | | 10/1994 | Kano et al. |
| 5,638,458 A | | 6/1997 | Giger et al. |
| 5,729,620 A | | 3/1998 | Wang |
| 5,790,690 A | * | 8/1998 | Doi et al. ............ 382/128 |
| 5,828,774 A | | 10/1998 | Wang |
| 5,911,014 A | * | 6/1999 | Yamada ............ 382/308 |
| 5,917,929 A | | 6/1999 | Marshall et al. |
| 5,982,915 A | | 11/1999 | Doi et al. |
| 5,987,094 A | | 11/1999 | Clarke et al. |
| 5,999,639 A | * | 12/1999 | Rogers et al. ............ 382/132 |
| 6,011,862 A | | 1/2000 | Doi et al. |
| 6,014,452 A | | 1/2000 | Zhang et al. |
| 6,075,879 A | | 6/2000 | Roehrig et al. |
| 6,088,473 A | | 7/2000 | Xu et al. |
| 6,125,194 A | | 9/2000 | Yeh et al. |
| 6,138,045 A | | 10/2000 | Kupinski et al. |
| 6,141,437 A | | 10/2000 | Xu et al. |
| 6,198,838 B1 | | 3/2001 | Roehrig et al. |
| 6,233,364 B1 | | 5/2001 | Krainiouk et al. |
| 6,240,201 B1 | | 5/2001 | Xu et al. |
| 6,282,307 B1 | | 8/2001 | Armato, III et al. |
| 6,335,980 B1 | | 1/2002 | Armato, III et al. |
| 6,404,908 B1 | | 6/2002 | Schneider et al. |
| 6,483,934 B2 | | 11/2002 | Armato, III et al. |
| 6,549,646 B1 | | 4/2003 | Yeh et al. |
| 6,577,752 B2 | | 6/2003 | Armato, III et al. |
| 6,609,021 B1 | | 8/2003 | Fan et al. |
| 6,654,728 B1 | | 11/2003 | Li et al. |
| 6,683,973 B2 | | 1/2004 | Li et al. |
| 6,690,816 B2 | | 2/2004 | Aylward et al. |
| 6,694,046 B2 | | 2/2004 | Doi et al. |
| 6,724,925 B2 | | 4/2004 | Armato, III et al. |
| 6,738,499 B1 | | 5/2004 | Doi et al. |
| 6,757,415 B1 | * | 6/2004 | Rogers et al. ............ 382/130 |
| 6,760,468 B1 | | 7/2004 | Yeh et al. |
| 6,766,043 B2 | | 7/2004 | Zeng et al. |
| 6,795,521 B2 | | 9/2004 | Hsu et al. |
| 6,801,645 B1 | | 10/2004 | Collins et al. |
| 6,813,375 B2 | | 11/2004 | Armato, III et al. |
| 6,937,776 B2 | * | 8/2005 | Li et al. ............ 382/260 |
| 7,043,066 B1 | | 5/2006 | Doi et al. |
| 7,054,473 B1 | | 5/2006 | Roehrig et al. |
| 7,088,850 B2 | | 8/2006 | Wei et al. |
| 7,203,349 B2 | | 4/2007 | Zhang et al. |
| 7,242,794 B2 | * | 7/2007 | Imamura et al. ............ 382/128 |
| 7,274,810 B2 | * | 9/2007 | Reeves et al. ............ 382/128 |
| 7,336,809 B2 | | 2/2008 | Zeng et al. |
| 7,346,202 B1 | | 3/2008 | Schneider |
| 7,359,538 B2 | | 4/2008 | Zeng et al. |
| 7,397,938 B2 | | 7/2008 | Cathier |
| 7,403,646 B2 | | 7/2008 | Sato |
| 7,480,401 B2 | | 1/2009 | Shen et al. |
| 7,492,968 B2 | | 2/2009 | Jerebko et al. |
| 7,593,561 B2 | | 9/2009 | Zhang et al. |
| 7,616,818 B2 | | 11/2009 | Dewaele |
| 7,646,902 B2 | | 1/2010 | Chan et al. |
| 8,164,039 B2 | | 4/2012 | Bovik et al. |
| 8,165,385 B2 | | 4/2012 | Reeves et al. |
| 8,260,014 B2 | | 9/2012 | Chen et al. |
| 8,488,863 B2 | | 7/2013 | Boucheron |
| 8,542,896 B2 | * | 9/2013 | Tanaka et al. ............ 382/128 |
| 8,634,622 B2 | * | 1/2014 | Woods et al. ............ 382/131 |
| 2001/0008562 A1 | | 7/2001 | Rogers et al. |
| 2002/0016539 A1 | | 2/2002 | Michaelis et al. |
| 2002/0041702 A1 | | 4/2002 | Takeo et al. |
| 2003/0007598 A1 | | 1/2003 | Wang et al. |
| 2004/0052328 A1 | | 3/2004 | Sabol et al. |
| 2004/0161141 A1 | | 8/2004 | Dewaele |
| 2005/0008211 A1 | | 1/2005 | Xu et al. |
| 2005/0010106 A1 | | 1/2005 | Lang et al. |
| 2006/0083418 A1 | | 4/2006 | Watson et al. |
| 2006/0171573 A1 | | 8/2006 | Rogers |
| 2006/0177125 A1 | | 8/2006 | Chan et al. |
| 2006/0239541 A1 | | 10/2006 | Florin et al. |
| 2006/0285751 A1 | | 12/2006 | Wu et al. |
| 2007/0005356 A1 | | 1/2007 | Perronnin |
| 2007/0019852 A1 | | 1/2007 | Schildkraut et al. |
| 2007/0092864 A1 | | 4/2007 | Reinhardt et al. |
| 2007/0237401 A1 | | 10/2007 | Coath et al. |
| 2007/0258648 A1 | | 11/2007 | Perronnin |
| 2008/0002873 A1 | | 1/2008 | Reeves et al. |
| 2008/0037852 A1 | | 2/2008 | Zhou et al. |
| 2008/0037853 A1 | | 2/2008 | Bernard et al. |
| 2008/0069425 A1 | | 3/2008 | Liu et al. |
| 2008/0069456 A1 | | 3/2008 | Perronnin |
| 2008/0292194 A1 | | 11/2008 | Scmidt et al. |
| 2008/0298666 A1 | | 12/2008 | Mysore Siddu et al. |
| 2008/0317322 A1 | | 12/2008 | Acharyya et al. |
| 2009/0052756 A1 | | 2/2009 | Saddi et al. |
| 2009/0052763 A1 | | 2/2009 | Acharyya et al. |
| 2009/0060297 A1 | | 3/2009 | Penn et al. |
| 2009/0097730 A1 | | 4/2009 | Kasai et al. |
| 2009/0116716 A1 | | 5/2009 | Zhou |
| 2009/0129657 A1 | | 5/2009 | Huo et al. |
| 2009/0171236 A1 | | 7/2009 | Davies |
| 2009/0180674 A1 | | 7/2009 | Chen et al. |
| 2009/0214099 A1 | | 8/2009 | Merlet |
| 2010/0002929 A1 | | 1/2010 | Sammak et al. |
| 2010/0008424 A1 | | 1/2010 | Pace |
| 2010/0046814 A1 | * | 2/2010 | Dewaele et al. ............ 382/128 |
| 2010/0054563 A1 | | 3/2010 | Mendonca et al. |
| 2010/0098343 A1 | | 4/2010 | Perronnin et al. |
| 2010/0104148 A1 | | 4/2010 | Bovik et al. |
| 2011/0274327 A1 | | 11/2011 | Wehnes et al. |
| 2011/0280465 A1 | | 11/2011 | Wehnes et al. |
| 2012/0294502 A1 | * | 11/2012 | Chan et al. ............ 382/131 |

FOREIGN PATENT DOCUMENTS

| | | |
|---|---|---|
| WO | WO 2011/137407 | 11/2011 |
| WO | WO 2011/137409 | 11/2011 |
| WO | WO 2011/137410 | 11/2011 |
| WO | WO 2011/137411 | 11/2011 |
| WO | WO 2012/006318 | 1/2012 |

OTHER PUBLICATIONS

"The ImageChecker® Technology," Patient Pamphlet, R2 Technology, Inc., circa 2002.
"ImageChecker™ CT: Server DICOM Conformance Statement," PN 390-00-448 Rev. C, R2 Technology, Inc., Sep. 2003.
"ImageChecker™ CT: Workstation DICOM Conformance Statement," PN 390-00-449 Rev. D, R2 Technology, Inc., Sep. 2003.
"Improving Sensitivity and Efficiency in Lung CT Nodule Detection," ImageChecker® CT LN-1000, Product Brochure, R2 Technology, Inc., circa 2003.
"Improving Sensitivity and Efficiency in Lung CT Nodule Detection," ImageChecker® CT, Product Brochure, R2 Technology, Inc., circa 2003.

(56) References Cited

OTHER PUBLICATIONS

"Integrated Tools for Streamlined Review of MDCT Lung Exams," ImageChecker® CT LN-500, Product Brochure, R2 Technology, Inc., circa 2003.
"OmniCad," Product Brochure, R2 Technology, Inc., Oct. 16, 2003.
"R2 Algorithm: The Intuitive Choice," Product Brochure, R2 Technology, Inc., 2003.
"The Total CAD Solution for Film and Digital Mammography," ImageChecker® DM, Product Brochure, R2 Technology, Inc., 2003.
"CheckMate™ Ultra with PeerView™," Webpage, http://www.r2tech.com/prd/prd005.html, R2 Technology, Inc., 2004, downloaded Jan. 16, 2004.
"Technical Specifications Sheet for the ImageChecker® Display Units," R2 Technology, Inc., 2004.
"Technical Specifications Sheet for the ImageChecker® Processing Units," R2 Technology, Inc., 2004.
R2 Technology, Inc. Products Overview Webpage, http://www.r2tech.com/prd/index.html, downloaded Jan. 16, 2004, 1 page.
Van Wijk, C. et al., "Detection and Segmentation of Colonic Polyps on Implicit Isosurfaces by Second Principal Curvature Flow," IEEE Transactions on Medical Imaging, vol. 29, No. 3, Mar. 2010, pp. 688-698.
PCT International Written Opinion for International Application No. PCT/US2011/034698, mailed Jul. 18, 2011, 4 pages.
PCT International Search Report for International Application No. PCT/US2011/034698, mailed Jul. 27, 2011, 2 pages.
PCT International Written Opinion for International Application No. PCT/US2011/034698, mailed Jul. 27, 2011, 4 pages.
PCT International Preliminary Report on Patentability for International Application No. PCT/US2011/034698, mailed Nov. 6, 2012, 5 pages.
R2 Technology, Inc. ImageChecker® Product Webpage, archived at http://web.archive.org/web/20040422174630/http://www.r2tech.com/prd/prd002.html, archive date Apr. 22, 2004, downloaded Jan. 7, 2013, 2 pages.
R2 Technology, Inc. Algorithm Webpage, archived at http://web.archive.org/web/20040225065830/http://www.r2tech.com/prd/prd001.html, archive date Feb. 25, 2004, downloaded Jan. 7, 2013, 2 pages.
R2 Technology, Inc. Products Overview Webpage, archived at http://web.archive.org/web/20040216010921/http://www.r2tech.com/prd.index.html, archive date Feb. 16, 2004, downloaded Jan. 7, 2013, 5 pages.
Japanese Office Action received in Application No. 2013-508074 mailed Apr. 7, 2015, 10 pages.
Wijk, et al., "Detection and Segmentation of Colonic Polyps on Implicit Isosurfaces by Second Principal Curvature Flow," IEEE Transactions on Medical Imaging, vol. 29, No. 3, Mar. 2010, 10 pages.
Chinese Office Action recieved in Application No. 201180028028.0 mailed May 5, 2015, 20 pages.

\* cited by examiner

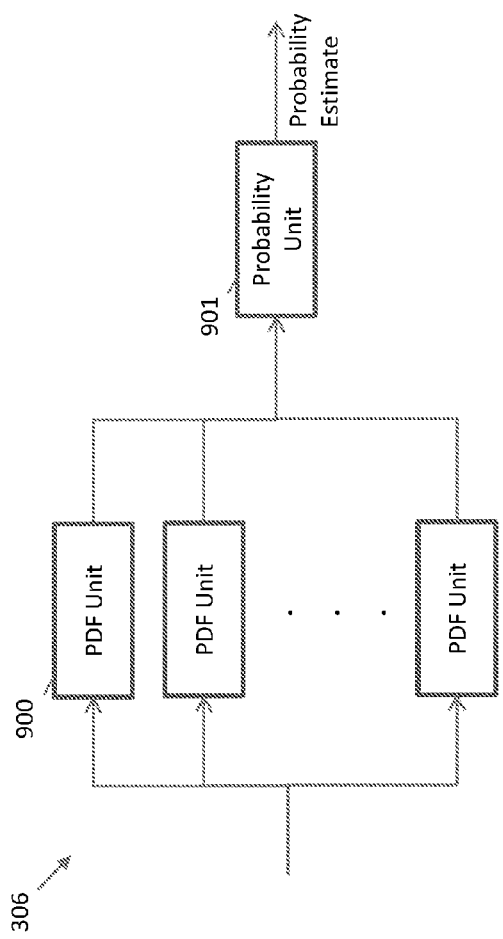
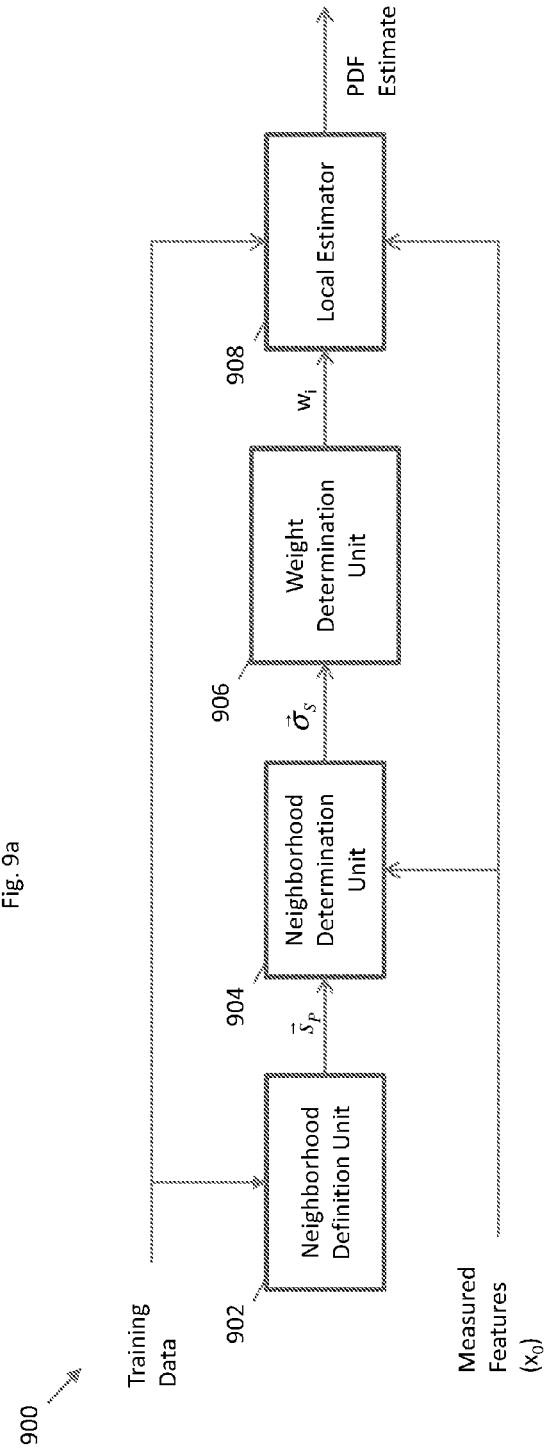
Fig. 9a
Fig. 9b

MALIGNANT MASS DETECTION AND CLASSIFICATION IN RADIOGRAPHIC IMAGES

This application claims the benefit of U.S. Provisional Application Ser. No. 61/343,609, filed on Apr. 30, 2010, U.S. Provisional Application Ser. No. 61/343,608, filed on Apr. 30, 2010, U.S. Provisional Application Ser. No. 61/343,552, filed on Apr. 30, 2010, U.S. Provisional Application Ser. No. 61/343,557, filed on Apr. 30, 2010, U.S. Provisional Application Ser. No. 61/395,029, filed on May 5, 2010, U.S. Provisional Application Ser. No. 61/398,571, filed on Jun. 25, 2010, U.S. Provisional Application Ser. No. 61/399,094, filed on Jul. 6, 2010, U.S. Provisional Application Ser. No. 61/400,573, filed on Jul. 28, 2010, all of which applications are hereby incorporated herein by reference.

TECHNICAL FIELD

The present disclosure relates generally to computer-aided detection of malignant mass signatures in radiographic images, and more particularly to a system for locating masses and determining mass features that allow malignant masses to be identified.

BACKGROUND

Radiologists use radiographic images such as mammograms to detect and pinpoint suspicious lesions in a patient as early as possible, e.g., before a disease is readily detectable by other, intrusive methods. As such, there is real benefit to the radiologist being able to locate, based on imagery, extremely faint lesions and precursors. Large masses of relatively dense tissue are one signature of concern. Although some masses can appear quite prominent in a radiographic image, various factors including occlusion/partial occlusion by other natural structure, appearance in a structurally "busy" portion of the image, sometimes coupled with radiologist fatigue, may make some masses hard to detect upon visual inspection.

Computer-Aided Detection (CAD) algorithms have been developed to assist radiologists in locating potential lesions in a radiographic image. CAD algorithms operate within a computer on a digital representation of the mammogram set for a patient. The digital representation can be the original or processed sensor data, when the mammograms are captured by a digital sensor, or a scanned version of a traditional film-based mammogram set. An "image," as used herein, is assumed to be at least two-dimensional data in a suitable digital representation for presentation to CAD algorithms, without distinction to the capture mechanism originally used to capture patient information. The CAD algorithms search the image for objects matching a signature of interest, and alert the radiologist when a signature of interest is found.

Classification of anomalies may be performed using a probability density function (PDF) that describes the relative likelihood of observing any given sample value of a random variable. The integral of a PDF over all possible values is 1; the integral of a PDF over a subset of the random variable's range expresses the probability that a drawn sample of a random variable will fall within that range.

PDFs that can be expressed by a closed-form equation are generally well understood, and many applications for such PDFs have been developed. On the other hand, the practical estimation of a PDF for a complex multidimensional random variable, particularly one with an unknown and possibly irregular distribution in each dimension, and/or long, sparsely populated tails, has in large part eluded researchers. In the area of pattern and image recognition, for instance, many researchers have abandoned PDF approaches and concentrated on known solvable alternatives, such as Neural Networks and linear discriminant functions, due to the practical difficulties in applying a PDF approach.

BRIEF DESCRIPTION OF THE DRAWINGS

The following is a brief description of the drawings, which illustrate exemplary embodiments of the present invention and in which:

FIGS. 9a and 9b illustrate a classifier probability unit in accordance with an embodiment;

DETAILED DESCRIPTION OF ILLUSTRATIVE EMBODIMENTS

Figure 1:
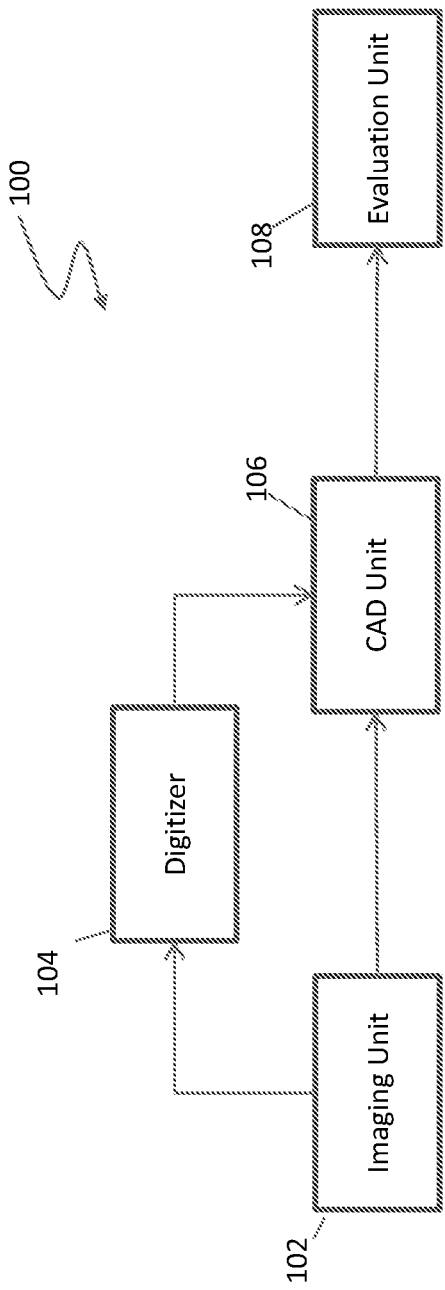
FIG. 1 is a system-level diagram for an anomaly detection system in accordance with an embodiment.

The making and using of embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

For example, embodiments discussed herein are generally described in terms of assisting medical personnel in the examination of breast x-ray images, such as those that may be obtained in the course of performing a mammogram. Other embodiments, however, may be used for other situations, including, for example, detecting anomalies in other tissues such as lung tissue, any type of image analysis for statistical anomalies, and the like.

Referring now to the drawings, wherein like reference numbers are used herein to designate like or similar elements throughout the various views, illustrative embodiments of the present invention are shown and described. The figures are not necessarily drawn to scale, and in some instances the drawings have been exaggerated and/or simplified in places for illustrative purposes only. One of ordinary skill in the art will appreciate the many possible applications and variations of the present invention based on the following illustrative embodiments of the present invention.

Referring first to FIG. 1, a system 100 for assisting in detecting anomalies during, for example, mammograms, is illustrated in accordance with an embodiment. The system 100 includes an imaging unit 102, a digitizer 104, and a computer aided detection (CAD) unit 106. The imaging unit 102 captures one or more images, such as x-ray images, of the area of interest, such as the breast tissue. In the embodiment in which the system 100 is used to assist in analyzing a mammogram, a series of four x-ray images may be taken while the breast is compressed to spread the breast tissue, thereby aiding in the detection of anomalies. The series of four x-ray images include a top-down image, referred to as a cranio caudal (CC) image, for each of the right and left breasts, and an oblique angled image taken from the top of the sternum angled downwards toward the outside of the body, referred to as the medio lateral oblique (MLO) image, for each of the right and left breasts.

The one or more images may be embodied on film or digitized. Historically the one or more images are embodied as x-ray images on film, but current technology allows for x-ray images to be captured directly as digital images in much the same way as modern digital cameras. As illustrated in FIG. 1, a digitizer 104 allows for digitization of film images into a digital format. The digital images may be formatted in any suitable format, such as industry standard Digital Imaging and Communications in Medicine (DICOM) format.

The digitized images, e.g., the digitized film images or images captured directly as digital images, are provided to a Computer-Aided Detection (CAD) unit 106. As discussed in greater detail below, the CAD unit 106 processes the one or more images to detect possible locations of various types of anomalies, such as calcifications, relatively dense regions, distortions, and/or the like. Once processed, locations of the possible anomalies, and optionally the digitized images, are provided to an evaluation unit 108 for viewing by a radiologist, the attending doctor, or other personnel, with or without markings indicating positions of any detected possible anomalies. The evaluation unit 108 may comprise a display, a workstation, portable device, and/or the like.

Figure 2:
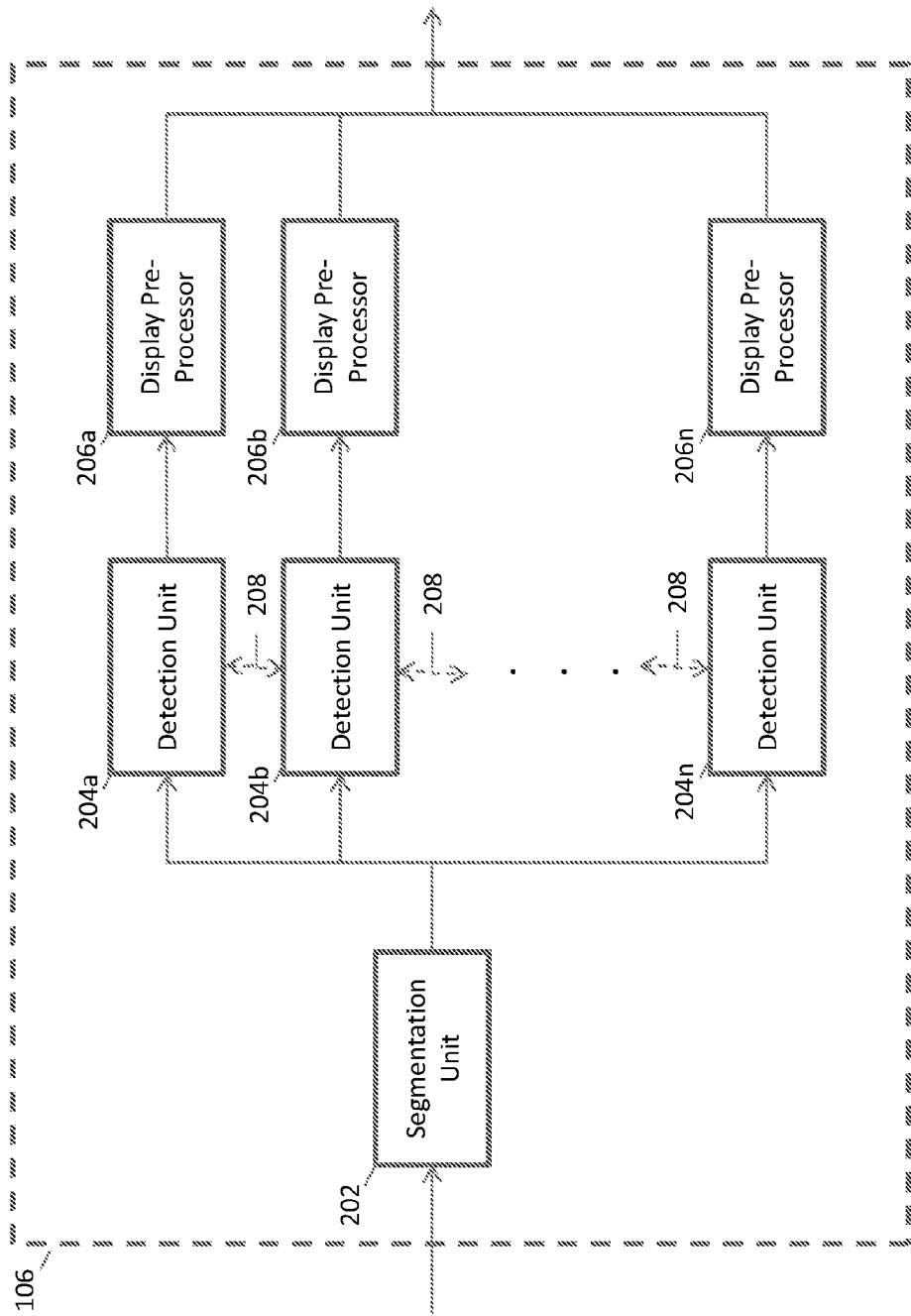
FIG. 2 is a component diagram of a Computer-Aided Detection (CAD) unit in accordance with an embodiment.

FIG. 2 illustrates components that may be utilized by the CAD unit 106 (see FIG. 1) in accordance with an embodiment. Generally, the CAD unit 106 includes a segmentation unit 202, one or more detection units 204a-204n, and one or more display pre-processors 206a-206n. As will be appreciated, an x-ray image, or other image, may include regions other than those regions of interest. For example, an x-ray image of a breast may include background regions as well as other structural regions such as the pectoral muscle. In these situations, it may be desirable to segment the x-ray image to define a search area, e.g., a bounded region defining the breast tissue, on which the one or more detection units 204a-204n is to analyze for anomalies.

The one or more detection units 204a-204c analyze the one or more images, or specific regions as defined by the segmentation unit 202, to detect specific types of features that may indicate one or more specific types of anomalies in the patient. For example, in an embodiment for use in examining human breast tissue, the detection units 204a-204n may comprise a calcification unit, a density (mass) unit, and a distortion unit. As is known in the medical field, the human body often reacts to cancerous cells by surrounding the cancerous cells with calcium, creating micro-calcifications. These micro-calcifications may appear as small, bright regions in the x-ray image. The calcification unit detects and identifies these regions of the breast as possible micro-calcifications.

It is further known that cancerous regions tend to be denser than surrounding tissue, so a region appearing as a generally brighter region indicating denser tissue than the surrounding tissue may indicate a cancerous region. Accordingly, the density unit analyzes the one or more breast x-ray images to detect relatively dense regions in the one or more images. Because the random overlap of normal breast tissue may sometimes appear suspicious, in some embodiments the density unit may correlate different views of an object, e.g., a breast, to determine if the dense region is present in other corresponding views. If the dense region appears in multiple views, then there is a higher likelihood that the region is truly malignant.

The distortion unit detects structural defects resulting from cancerous cells effect on the surrounding tissue. Cancerous cells frequently have the effect of "pulling in" surrounding tissue, resulting in spiculations that appear as a stretch mark, star pattern, or other linear line patterns.

It should be noted that the above examples of the detection units 204a-204n, e.g., the calcification unit, the density unit, and the distortion unit, are provided for illustrative purposes only and that other embodiments may include more or fewer detection units. It should also be noted that some detection units may interact with other detection units, as indicated by the dotted line 208. The detection units 204a-204n are discussed in greater detail below with reference to FIG. 3.

The display pre-processors 206a-206n create image data to indicate the location and/or the type of anomaly. For example, micro-calcifications may be indicated by a line encircling the area of concern by one type of line (e.g., solid lines), while spiculations (or other type of anomaly) may be indicated by a line encircling the area of concern by another type of line (e.g., dashed lines).

Figure 3:
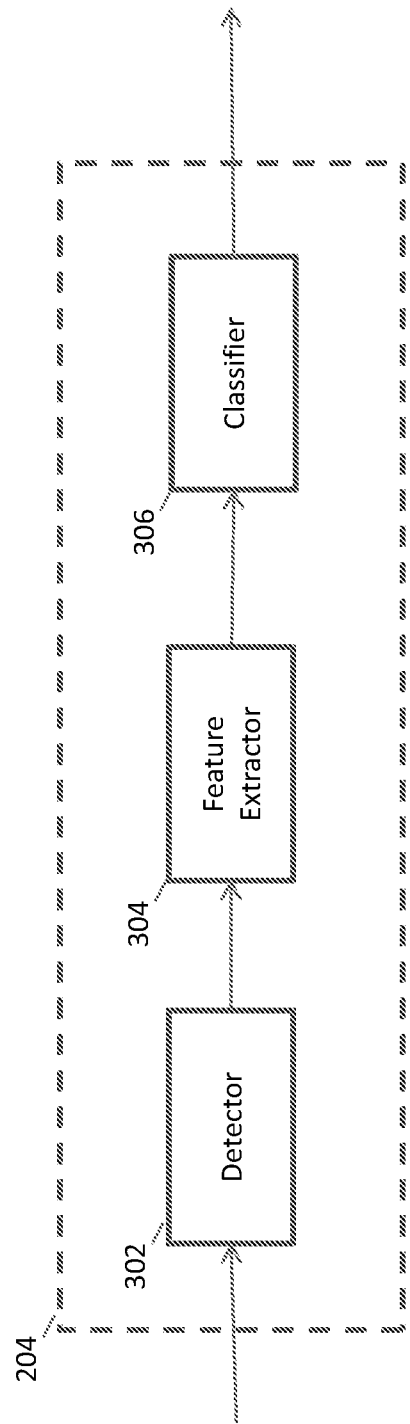
FIG. 3 is a component diagram of a detection unit in accordance with an embodiment.

FIG. 3 illustrates components of that may be utilized for each of the detection units 204a-204n in accordance with an embodiment. Generally, each of the detection units 204a-204n may include a detector 302, a feature extractor 304, and a classifier 306. The detector 302 analyzes the image to identify attributes indicative of the type of anomaly that the detection unit is designed to detect, such as calcifications, and the feature extractor 304 extracts predetermined features of each detected region. For example, the predetermined features may include the size, the signal-to-noise ratio, location, and the like.

The classifier 306 examines each extracted feature from the feature extractor 304 and determines a probability that the extracted feature is an abnormality. Once the probability is determined, the probability is compared to a threshold to determine whether or not a detected region is to be reported as a possible area of concern.

A suitable segmentation unit 202 is specified in U.S. Provisional Application Ser. Nos. 61/400,573 and 61/398,571, suitable detection units for use in detecting and classifying microcalcifications are specified in U.S. Provisional Application Ser. Nos. 61/343,557 and 61/343,609 and co-filed U.S. patent application Ser. No. 13/695,347, a suitable detection unit for detecting and classifying spiculated malignant masses is specified in U.S. Provisional Application Ser. No. 61/395,029 and co-filed U.S. patent application Ser. No. 13/695,369, a suitable probability density function estimator is specified in U.S. Provisional Application Ser. No. 61/343, 608 and co-filed U.S. patent application Ser. No. 13/695,351, and suitable display pre-processors are specified in U.S. Provisional Application Ser. Nos. 61/399,094, all of which are incorporated herein by reference.

Figure 4:
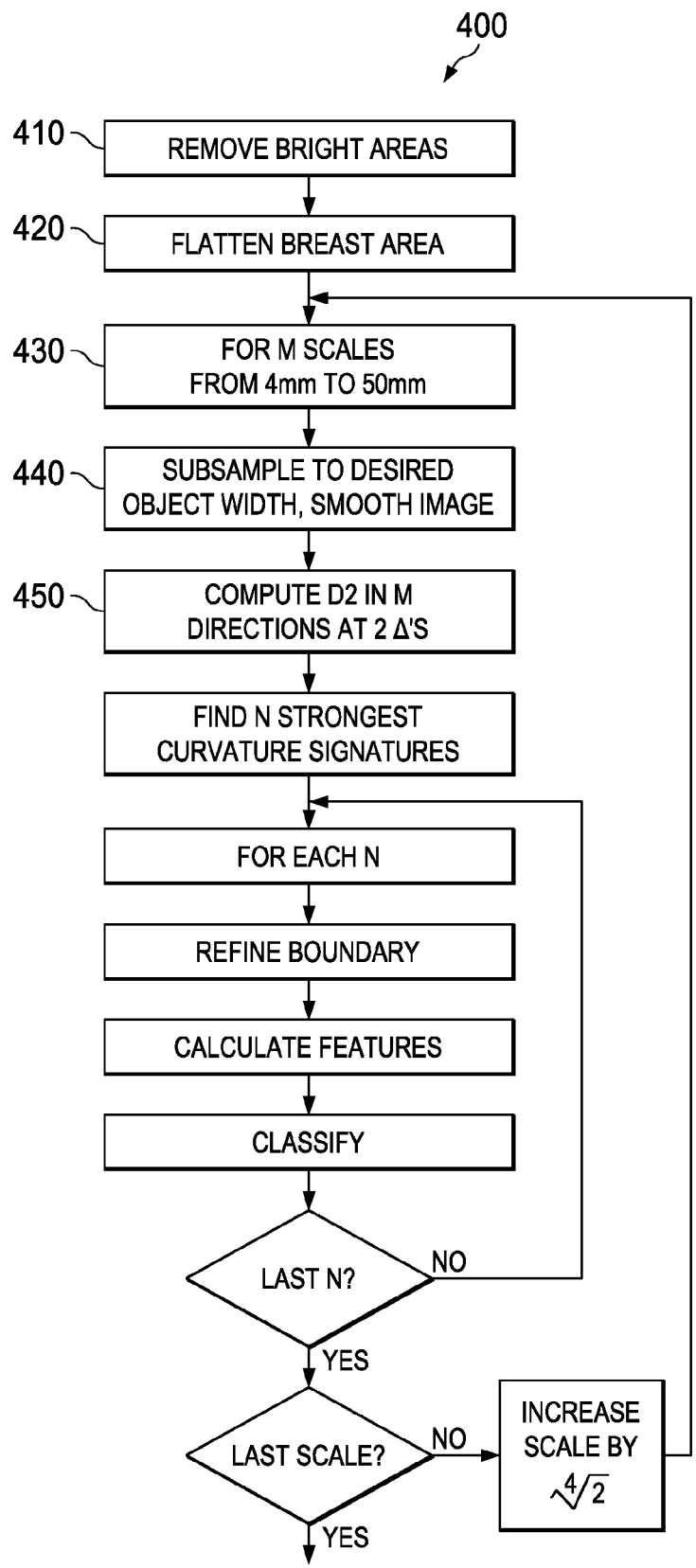
FIG. 4 contains a flowchart for an overall mass detection and classification process according to an embodiment.

The following paragraphs provide greater details regarding a potentially malignant mass detection unit, such as may be utilized as one or more of the detection units 204a-204n (see FIG. 2) in accordance with an embodiment. In particular, the embodiments described below seek to detect and classify potentially malignant masses in a radiographic image. FIG. 4 contains a flowchart 400 for a detection/classification process according to an embodiment.

At a first step 410, bright areas representing strong edges (typically image artifacts), bright lines such as skin folds, and large bright areas are removed from the image. Such areas are readily recognizable by second derivative outliers, with confirmation features such as linearity, orientation, or a "V" shape in the case of a skin fold, aiding recognition. The system marks, on a valid pixel image, pixels belonging to these types of signatures as invalid. Once marked as invalid, such pixels are not used in mass detection to prevent their extremely strong signatures from masking nearby weak signatures of interest.

Figure 5:
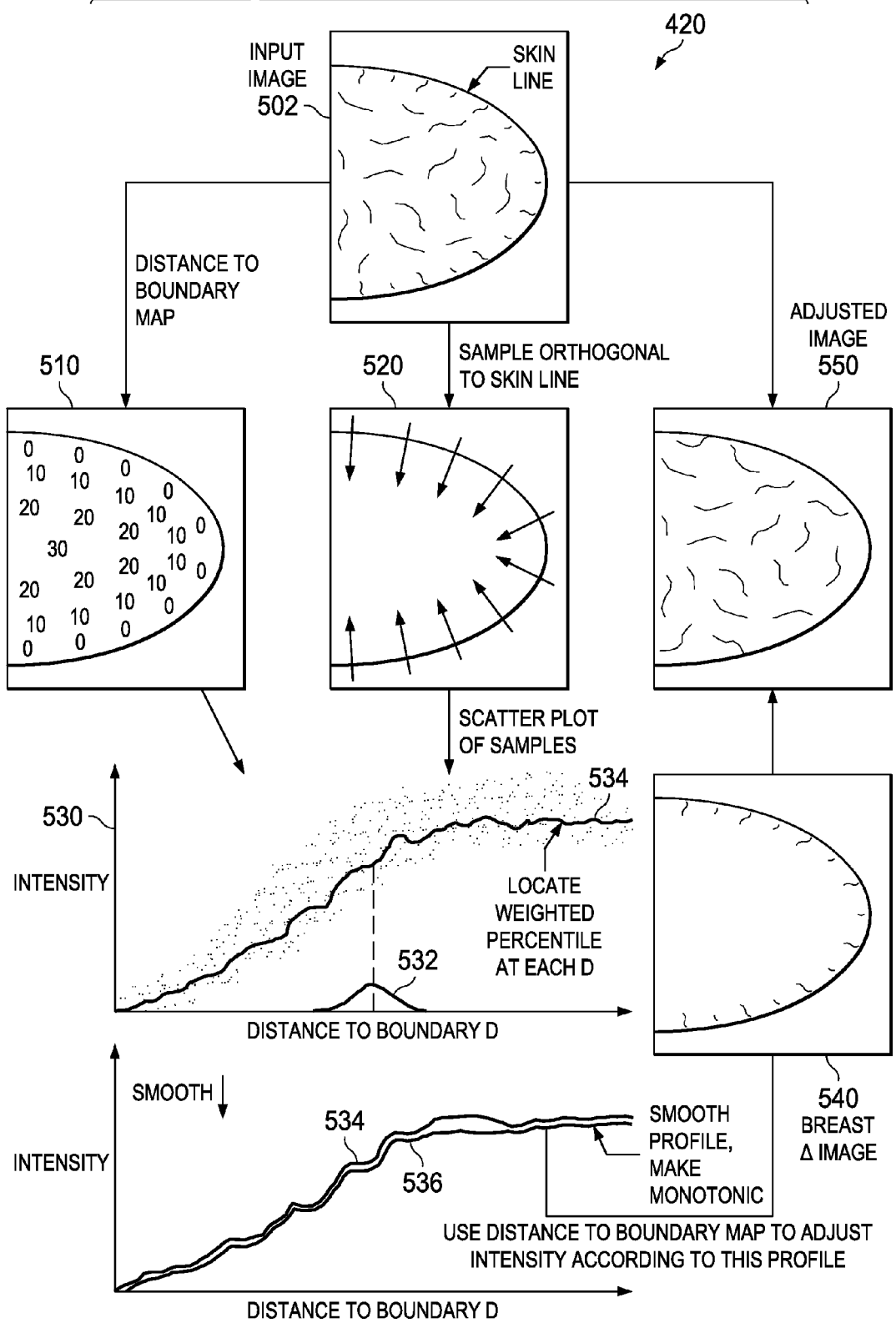
FIG. 5 illustrates a process for compensating for large-scale intensity gradients in a mammogram due to variations in tissue thickness near the breast boundary.

An optional step 420 is an intensity-flattening step for the breast tissue area. This step estimates a compensation for the decrease in tissue thickness near the skin line, which results in additional image exposure and density near the breast boundary. FIG. 5 illustrates details in the intensity-flattening process.

The skin line is used as a starting point to create a distance-to-boundary map 510 of the breast tissue. Pixels along the skin line are assigned a zero distance in the map 510, pixels that are a valid part of the breast and touching the zero-distance pixels are assigned a unit distance, pixels touching the unit-distance pixels are assigned a two-unit distance, and so forth, with the process continuing until all valid pixels are assigned a distance (optionally, the process can be stopped early at some fixed distance beyond which a high confidence exists that imaged thickness remains constant).

The image intensity is sampled along a large number of lines orthogonal to the skin line, all along the skin line, as shown in process 520. As intensity samples are collected along each line, the samples are collected in data structure groups according to the skin line distance written in map 510. Although the system embodiment does not actually create a scatter plot, scatter plot 530 illustrates, intuitively, a typical distribution of intensity versus boundary distance, D. At any distance D, individual pixel intensity varies according to the structure crossed in each sample line, with a general underlying trend representing an "undersignal." The undersignal represents the x-ray absorption expected for minimally dense tissue of a thickness found a given distance from the skin line. It is this undersignal that is estimated and removed.

One approach can define the minimum pixel intensity at each distance D as the undersignal at that distance. Due to noise, uncertainty in skin line determination, variations along the breast contour in how quickly the thickness tapers toward the skin line, etc., this approach can lack robustness (although it may work well with some digital imagery). An alternate embodiment sorts the samples into ascending order for each D, and weights samples at distances close to D according to a weighting function 532. The undersignal point is selected at the intensity that is above a given percentage P of the weighted pixels (at D and surrounding distances), with values of P of about 30% exhibiting good performance.

The calculated undersignal may not monotonically increase with increasing D, even though the actual undersignal would be expected to increase monotonically. A smoothing step forces monotonicity upon the undersignal 534, by starting at the largest D modeled and moving toward 0. At each point D, a smoothed undersignal 536 adopts the same value as undersignal 534, unless undersignal 534 increases. When undersignal 534 increases, smoothed undersignal 536 remains constant until D decreases to a point that undersignal 534 drops to at least the value of smoothed undersignal 536. At this point, smoothed undersignal 536 will continue to track undersignal 534 again until the next upwards excursion of undersignal 534.

Once the smoothed undersignal 536 is complete, it is combined with distance-to-boundary map 510 to create a breast Δ image 540 that describes an intensity that is to be subtracted from that image pixel to remove the undersignal. The final, adjusted image 550 is created by subtracting the breast Δ image 540 from the input image 202.

Referring again to FIG. 4, adjusted image 550 is passed to mass detection, which begins at step 430. Mass detection attempts to find objects at a selectable number of scales. In one embodiment, M scales are attempted, from 4 mm to 50 mm, with each scale spaced from its neighbors by a multiplicative scale factor $\sqrt[4]{2}$.

At each scale, significantly finer structure than the mass of interest is not desired for detection. Accordingly, in step 440 the adjusted image 550 is subsampled by an integer factor related to the scale, and then smoothed with a Gaussian function related to the subsample factor.

Figure 6:
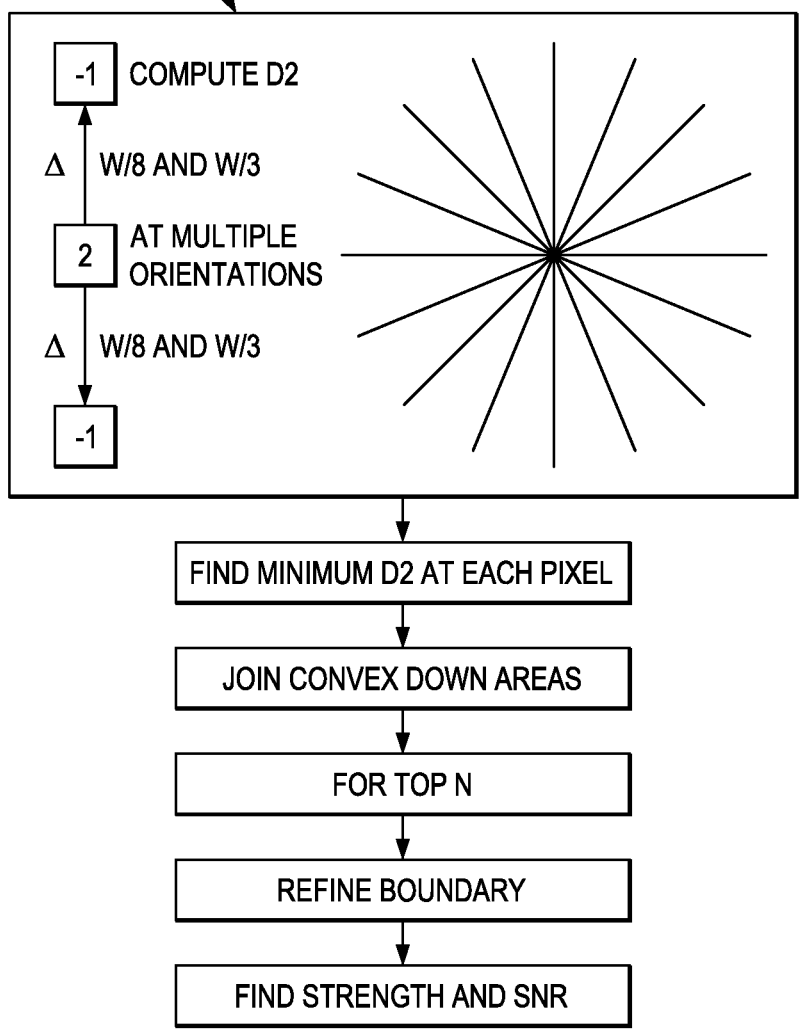
FIG. 6 contains a flowchart describing further details in a potential mass detection process.

Once the subsampled image is smoothed, in step 450 of FIG. 4 second derivative (D2) measurements are taken at two scales, as shown in FIG. 6 block 452. The fine scale calculates second derivatives at three image points spaced at W/8, where W is the scale of interest. The large scale calculates second derivatives at three image points spaced at W/3. The second derivatives are calculated at multiple orientations.

The finer-scaled D2 measurements are used to build a noise map for the scale. From among all orientations tested, the minimum absolute D2 measurement is saved in a noise map for use in SNR (Signal-to-Noise Ratio) measurements.

The larger-scaled D2 measurements are used to define a minimum negative second derivative (Min ND2) measurement at each pixel. When Min ND2 is negative at a given pixel, this signifies that the D2 measurement at all orientations indicated a convex down curvature. Areas of 8-neighbor connected convex down curvature are joined, with each such area identifying a raw potential mass location. Each such area is eroded and then dilated.

Of the remaining pixels after erosion and dilation, the Max ND2 value (most convex down curvature recorded) is taken as a strength measure for the convex down area. The N areas producing the highest strength measures at the current scale are selected as objects for further processing.

Figure 7:
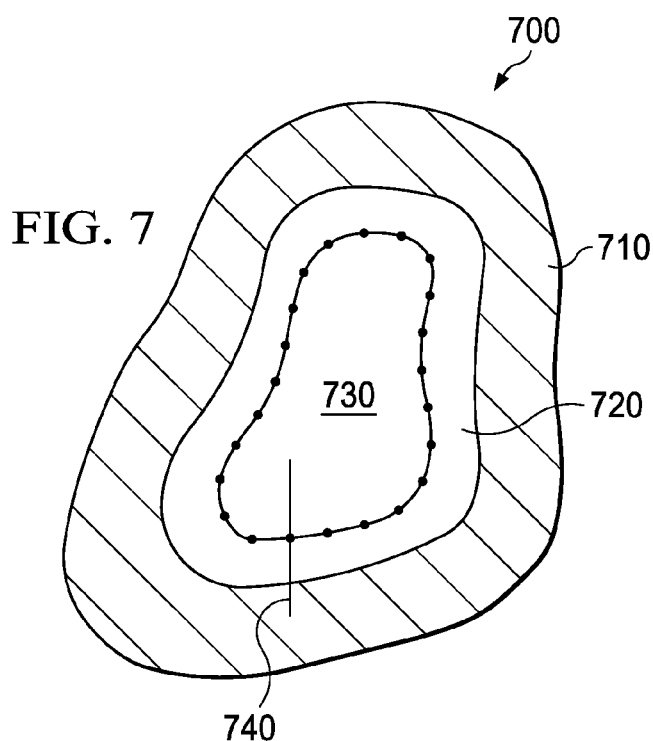
FIG. 7 depicts an exemplary mass signature as obtained in an iteration of an embodiment.

The object boundaries are refined to remove high frequency corners, and then resampled at 0.5-pixel increments, such as shown for object 730 in FIG. 7.

Strength measurements are made around convex segments of object 730 at the boundary pixel locations, from the subsampled image 700. Each boundary pixel is compared to the intensity at several locations along a line 740 orthogonal to the boundary. For locations 720 outside the object, an outer contrast is calculated, and the minimum outer contrast (the background is expected to have a lower intensity than the object) is saved. For each boundary pixel, its strength is defined as the minimum of its inner and outer strengths. The SNR of the object is defined as its minimum boundary strength, divided by the standard deviation of the D2 measurements in boundary region 710.

Nine classification features for each object are calculated. The features include search width index, x position (e.g., nipple distance), y position, SNR, object rank, relative arc length, dip SNR, global SNR, and other side SNR. Each will be described in turn.

Search width index describes the scale at which the object was detected.

Figure 8:
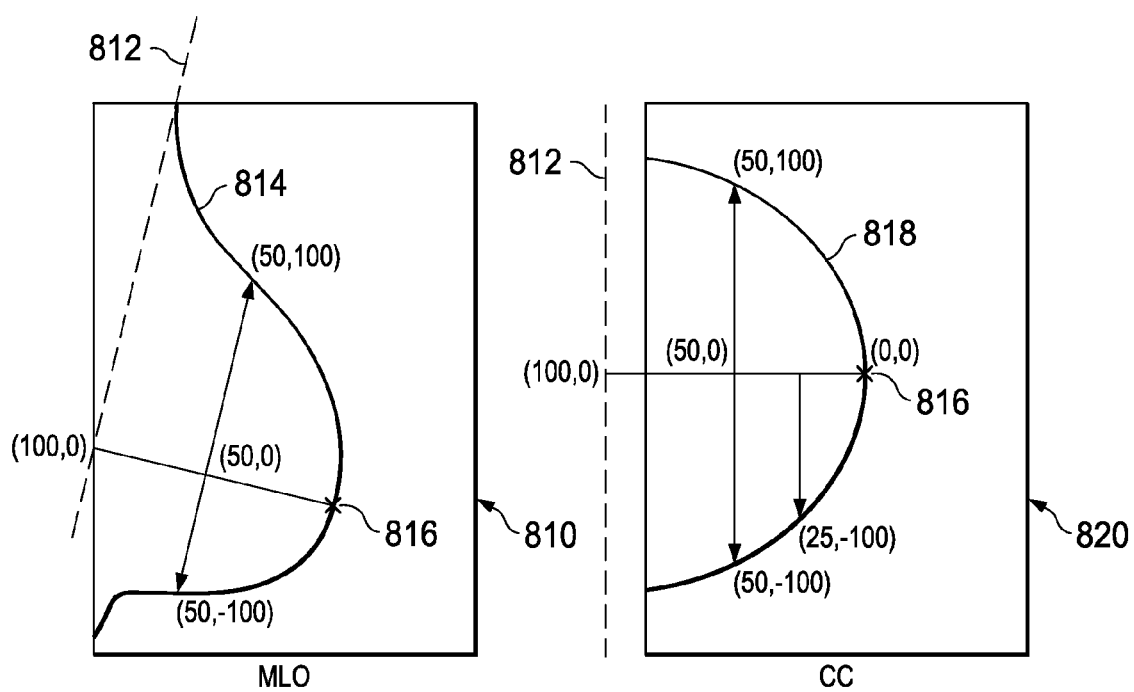
FIG. 8 illustrates a breast coordinate system used in the embodiments.

Nipple distance and y position describe the location of the object in the breast, in a novel breast coordinate system. The novel coordinate system allows mass location to form a meaningful and classifiable feature, despite the large variation in patient size, breast size, and breast shape. Typical radiological views for mammography include a mediolateral oblique view (MLO, shown as view 810 in FIG. 8) and a cranio-caudal view (CC, shown as view 820 in FIG. 8). Other, less-common views are also occasionally taken, and can be expressed in similar coordinate systems.

The MLO view is segmented to find the pectoral line 812 and the skin line 814. The nipple 816 is defined in the coordinate system as the point on the skin line furthest from the pectoral line 812, measured orthogonal to the pectoral line. The x-axis of the coordinate system is the line running from the nipple point 816 to the pectoral line 812, with the value 0 lying at the nipple point and the value 100 lying at the pectoral line. The pectoral line may not actually be visible in the image at the x-axis position, but is assumed to extend as far as needed below the visible portion to form the coordinate system. Thus the x-coordinate of any point in the breast is the percentage of the distance from the nipple (front) of the breast to the pectoral line (back) of the breast.

The y-coordinate in the breast coordinate system is also expressed on a 0 to 100 scale (points below the x-axis are expressed on a 0 to −100 scale). The scale changes, however, with x-value, as 100 or −100 is defined, for a given x-coordinate, as the point orthogonal to the x-axis at the x-value where the skin line is crossed. Since the cross-sectional profile of the breast generally expands as one traverses the image from the nipple point to the pectoral line, the scale units near the pectoral line are significantly larger than the scale units near the nipple point. The normalized scaling, however, allows statistical frequency of object occurrence as a function of breast position to be tabulated without regard to breast shape and size discrepancies. Several exemplary coordinates are shown on MLO view 810.

For CC view 820, the pectoral line is often not visible. The coordinate system for the CC view assumes that the pectoral line 812 is perpendicular to the view edge, and therefore the nipple point 816 is the point on skin line 818 that is furthest from the image edge. The coordinate system also assumes that the pectoral line 812 is located the same absolute distance from the nipple point as that measured in MLO view 810. Assuming this x-axis definition, a similar x-axis-to-skin-line y-coordinate system as that used in the MLO view is adopted for the CC view. Several exemplary coordinates are shown on MLO view 820.

The SNR of the object has been described above.

The object rank is a number between 1 and 9, indicating its relative position among the objects detected at this scale.

The relative arc length is calculated as l/πw, where w is the scale and l is the boundary length of the object.

DIP SNR is a weighted percentile of the ND2 values measured at the W/8 scale, divided by the median noise value for region 710.

Global SNR is defined as the strength of the segment, divided by the standard deviation of Min ND2, taken over the entire breast.

Other side SNR is measured, using breast coordinates, from the same scale and approximately the same location in a corresponding mammogram of the opposite breast. Other side SNR provides information to the classifier indicating that the patient may have bilaterally similar structure at that scale in both breasts, which may tend to indicate a non-malignancy.

During a training phase, the same object detection process and feature calculator are run on a training set containing a large number of radiographic images, with and without masses indicative of malignancy. Human-interactive classification, using one or more individuals with training in interpreting radiological images, indicates malignancy or non-malignancy for each object found in the training set. Using the training set objects, features, and human-input classification truthing, a multidimensional probability density function (PDF) data set is calculated.

FIGS. 9a and 9b illustrate an example of a classifier 306 that may be used in an embodiment. Generally, the classifier estimates the probability that an evaluation point belongs to a particular class by first estimating the PDF value for each of two or more classes and then combining the different class PDF values into a probability. The combining of PDF values to estimate a probability can be performed using techniques such as the well-known Bayes' law. The classifier could also use the PDF estimates to generate likelihood ratios instead of probability values. In this embodiment, the classifier 306 includes one or more PDF units 900 providing PDF estimates to a Probability unit 901. Generally, the PDF units 900 determine a PDF estimate for each possible classification for an object. For example, in an embodiment in which the classifier 306 is utilized to classify a microcalcification, there may be a PDF unit 900 for each of a malignant microcalcification, a benign microcalcification, a lucent microcalcification, a vascular microcalcification, a film artifact, and anything else. Greater detail regarding the PDF unit 900 is provided below.

Referring now to FIG. 9b, a classifier probability unit 900 that may be used by the classifier 306 (see FIG. 3) in accordance with an embodiment is shown, although different classifier probability units may be utilized. A neighborhood definition unit 902 of the PDF estimator unit 900 functionally defines neighborhood sizes for each representation point or bin of representation points. In some embodiments a variable neighborhood size may be desirable in order to allow for a functional description that better fits the actual measured feature data. In this embodiment, the neighborhood definition unit 902 evaluates training data received, e.g., from a database, and determines the appropriate neighborhood sizes for the representation points included in the training data. The neighborhood definition unit 902 provides vector $\vec{s}_P$ (a vector representing scale parameters for each representation point or bin of representation points for each feature or dimension) to a neighborhood determination unit 904. In an embodiment, the neighborhood definition unit 902 is performed off-line and the results, e.g., $\vec{s}_P$, are stored, such as being stored in a database, for later access. The vector $\vec{s}_P$ is utilized by the neighborhood determination unit 904 to determine a scale parameter vector $\vec{\sigma}_S$—the size of the neighborhood to be used for the evaluation point $x_0$ for each dimension or feature. The scale parameter vector $\vec{\sigma}_S$ is provided to a weight determination unit 906 to determine weights $w_i$, which specifies how much weight to allocate to representation points of the training data. Once determined, the weights $w_i$ are provided to a local estimator 908. The local estimator 908 applies the weights $w_i$ to the training data to determine a PDF estimate for the point $x_0$, which may be stored, e.g., in a database. The following paragraphs provide greater detail.

PDF estimation for real-world multivariable systems with complex and/or sparse long-tailed distributions has historically been thwarted by several inherent difficulties. First, First, the well-studied, but highly-constrained, parametric models are often unable to accurately represent PDFs encountered in real-world applications. Second, if the models used are highly flexible or nonparametric, (for example, Parzen window based approaches) then the estimated values can be unreliable due to random sample variation. This is particularly true in the tail regions of a PDF where there are few samples. Methods to improve estimator reliability can result in intractable computation or memory requirements.

Embodiments described herein take a novel approach to PDF estimation. Instead of estimating and storing a complete PDF, a data set is stored that allows on-the-fly computation of a PDF estimator function for any specific local region in the PDF. The amount of data required to store an estimated PDF in this manner can be on the order of n×M, where n is the dimensionality of the system and M is a number of representation points, $r_i$. Each representation point represents one or more samples from the actual distribution that is being estimated. For instance, each sample in a sample set can receive its own representation point, with a unit weighting. Each sample can alternately be expressed through a representation point with a weight less than one. For instance, if two different multi-dimensional measurements are believed to originate from the same sample, each of the two samples can be given a representation point with a weight of 0.5. Finally, a representation point can "bin" several samples that are close in measurement space, by replacing the samples with a single representation point with a weight equal to the weights of the individual samples. The actual multidimensional sample value for a binned samples representation point can be the center of the bin, the mean of the binned samples, the median of the binned sample values in each dimension, etc.

In addition to the representation points, several other inputs are selected prior to performing estimation. One input is the evaluation point, $x_0$, at which the PDF is to be estimated. Another input is a vector $\vec{s}_P$, provided by the neighborhood definition unit 902 in an embodiment, represents a set of scalar parameters that allow computation of a scale parameter vector, $\vec{\sigma}_S$. The scale parameter vector determines which of the representation points will be used in the estimation, and also can be a parameter for a function that determines the weight to be applied to each included point. Another input is the weighting function, $g(\vec{\sigma}_S)$, that will actually be applied to the representation points used in the estimation. The final input is a parameterized estimator function, $f(x_0, \theta)$, where $\theta$ is a parameter matrix for the function.

Figure 10:
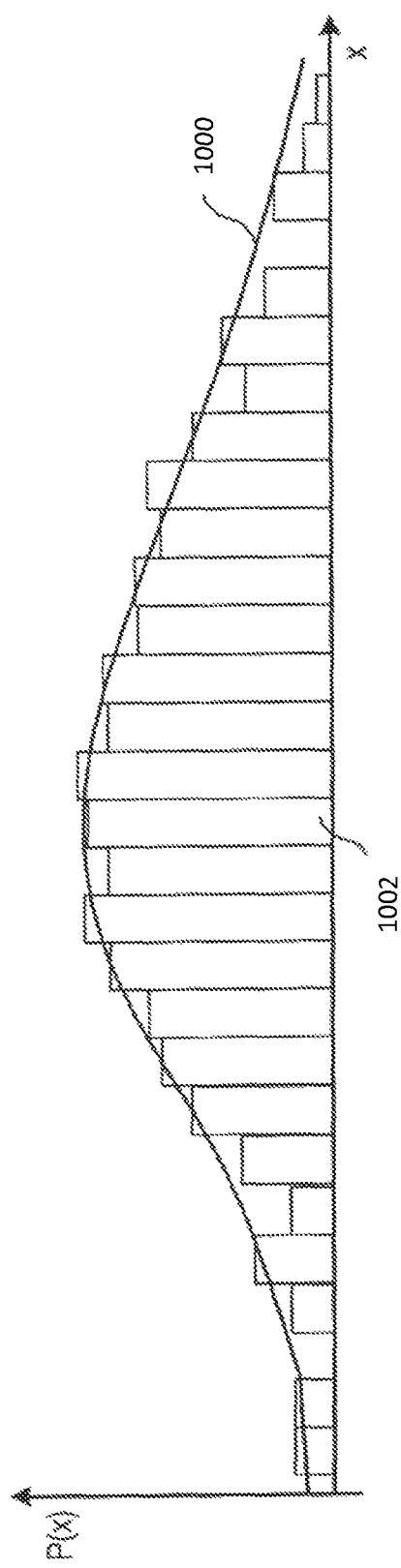
FIG. 10 illustrates a closed form PDF and a histogram of a sample distribution drawn from the probability distribution.

FIG. 10 shows a generic PDF 1000 for a one-dimensional random variable, superimposed on a histogram of a sample distribution drawn from the population of samples 1002 of the same random variable. With a large enough number of points, the histogram will tend towards a quantized version of the shape of PDF 1000, which may be estimated by a prior art technique such as a Parzen window. Towards the tails of PDF 1000, such an approach has difficulty producing a reliable estimate. The small number of samples often present in the tails means that in the tails, a simple windowed estimate either has high variance, due to the small number of samples, or fails to account for the true shape of the actual PDF, due to the application of a large linear window.

In preferred embodiments, the input data includes pre-calculated parameters from which an appropriate scale parameter can be calculated for any input evaluation point by, for example, the neighborhood determination unit 904. Generally, the scale parameter will be larger towards the tails of the distribution, and smaller in more data-rich areas of the representation point space. Although a separate data structure can be used to store a description of the scale parameter over all sample space, in one embodiment each representation point stores parameters that can be used to calculate a scale parameter vector on the fly.

Figure 11:
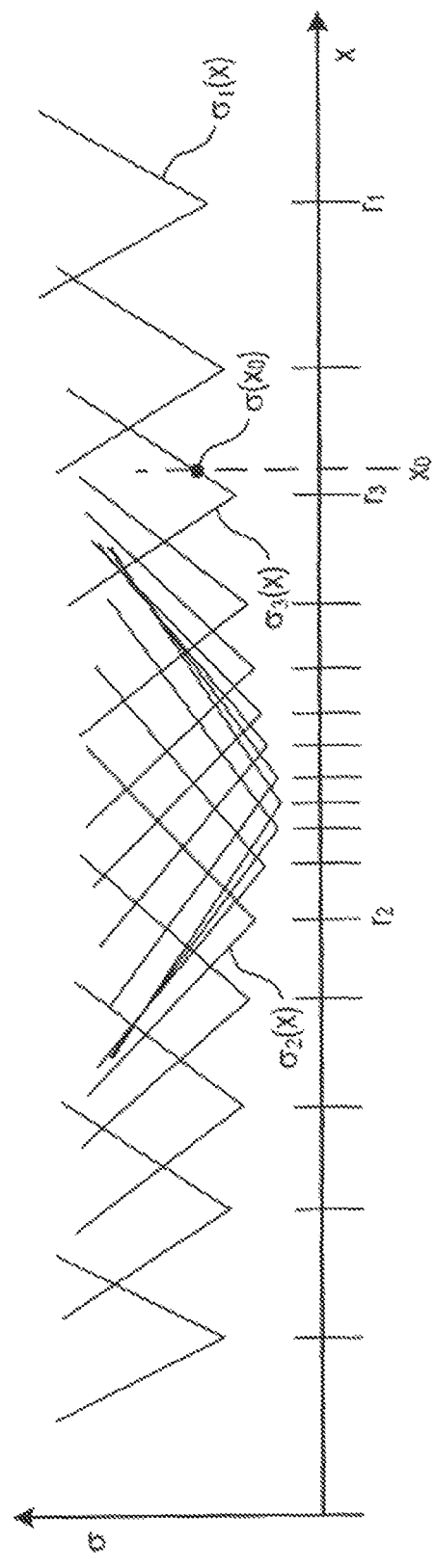
FIG. 11 shows, conceptually, estimation of a sigma value for a hypothetical one-dimensional distribution expressed by a set of representation points.

FIG. 11 illustrates one embodiment of representation-point scale parameter storage and usage, where each representation point $r_i$ also describes a minimum scale parameter value $\sigma_{MIN}(i)$ and a scale parameter slope $\sigma_{d\sigma}(i)$ for a scale parameter function $\sigma_i(x_0) = \sigma_{MIN}(i) + \sigma_{d\sigma}(i)|x_0 - r_i|$. Thus for any evaluation point $x_0$, the scale parameter function allows calculation of a scale parameter. The scale parameter for use with an evaluation point can thus be defined as the minimum scale parameter function value $\sigma_i(x_0)$, evaluated for all i, which minimum values $\vec{\sigma}_S$ are provided to the weight determination unit 906. In practical applications, the scale parameter may need only be evaluated for representation points close to the evaluation point. This can be seen by an inspection of FIG. 12, where scale parameter functions $\sigma_i(x)$ are plotted for each evaluation point ($\sigma_1(x)$, for $r_1$, $\sigma_2(x)$, for $r_2$, $\sigma_3(x)$, for $r_3$, are labeled). The value $\sigma_3(x_0)$ is lower than the scale parameter function values associated with all other representation points, and is thus selected as the scale parameter for evaluation point $x_0$. Alternatively, the different scale parameter function values could be combined with mathematical functions other than "min" (for example, the mean or a particular percentile of the different values could be used).

With multiple dimensions, a different scale parameter will typically be found for each dimension, depending on the local sparseness of representation points around $x_0$ in that dimension.

Figure 12:
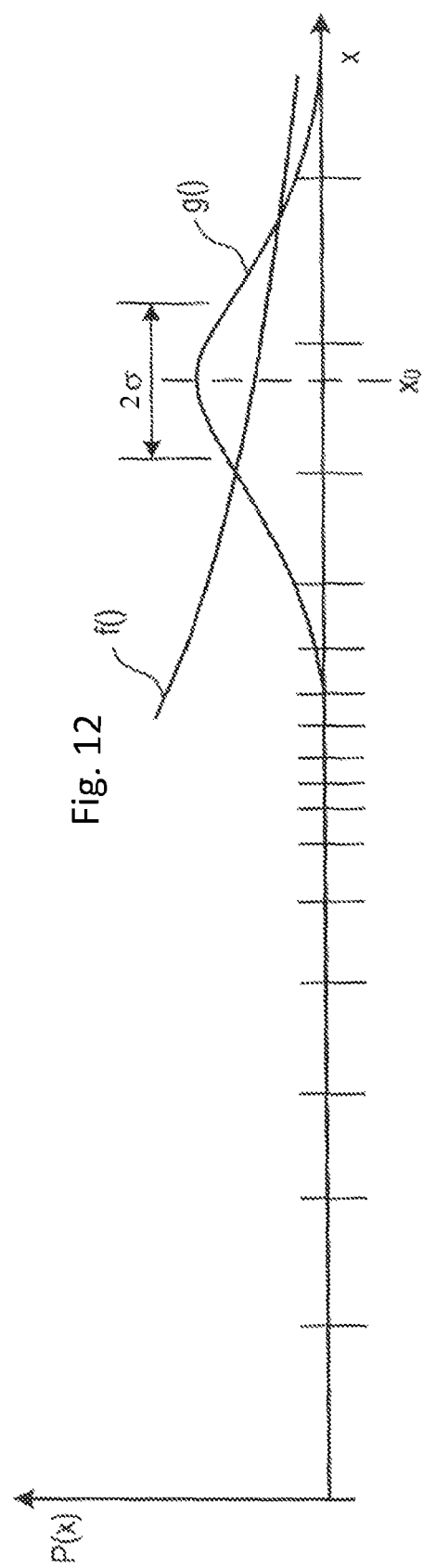
FIG. 12 shows application of the FIG. 11 sigma value to estimation of the PDF at the evaluation point.

Once the scale parameter for each dimension is found, the scale parameter can next be used to limit the representation points that will be used to estimate the PDF at the evaluation point. For instance, a practical rule of thumb based on distance from the evaluation point, such as a multiple of the scale factor, can be used to exclude representation points that practically cannot affect the calculation as illustrated in FIG. 12, thus saving computation time. Alternately, all representation points can be evaluated, no matter how far they lie from the evaluation point.

The scale parameter is also employed to calculate an overall weight for each representation point using the defined weighting function $w_i = g(r_i; x_0, \sigma(x_0))$, as illustrated by the weight determination unit 906 (FIG. 9).

The selected, weighted representation points are used to calculate a parameter matrix, $\theta$, for the parameterized estimator function $f(x, \theta)$ calculated by the local estimator 908. In an embodiment, the parameter matrix is calculated to maximize the function:

$$\sum_i [w_i \cdot h(f(r_i, \theta))],$$

where h( ) is a monotonic function.

For some function selections, when the modeled PDF is nonzero for all points in n-dimensional space, equations can be used to solve for the parameter matrix. In one such embodiment, the weight function g( ) is a Gaussian function, h( ) is a log function, and f( ) is a second-order exponential function:

$$f(x,\theta) = C \cdot e^{\theta_1 x^2 + \theta_2 x}, \text{ where}$$

$$C = \frac{1}{N} \frac{\sum_i g(r_i; x_0, \sigma(x_0))}{\int_x g(x; x_0, \sigma(x_0)) e^{\theta_1 x^2 + \theta_2 x}}$$

and N is the number of representation points.

In a multidimensional solution, the above equations are still applied, with the understanding that the variables and parameters are multidimensional.

The general approach described above can also be applied where the PDF has a zero value in some parts of n-dimensional space. The approach can also be applied where h, g, or f are not in a directly solvable form. In such cases, the parameter matrix can be approximated using numerical methods, such as Newton-Rhapson optimization.

Once the parameter matrix for the estimator function has been found, it is now possible to evaluate the estimator function at the evaluation point to obtain a PDF value.

A wide variety of applications exist for PDF techniques according to an embodiment. Some disciplines that can benefit from accurate PDF estimation include pattern recognition, classification, estimation, computer vision, image processing, and signal processing. The compact space requirements of the PDF estimation data add practicality for PDF data set compact storage, update distribution, the inclusion of additional discriminant variables and/or classes, etc.

Although several embodiments and alternative implementations have been described, many other modifications and implementation techniques will be apparent to those skilled in the art upon reading this disclosure. In a given embodiment, the equation used to solve for the estimator function parameters can be defined such that its minimization selects the parameter matrix. The scale parameter for a given evaluation point can be calculated at runtime from the representation points directly, although good solutions for the scale parameter may be more costly to calculate without precalculation of per-representation point functions.

Unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless otherwise indicated.

Figure 13:
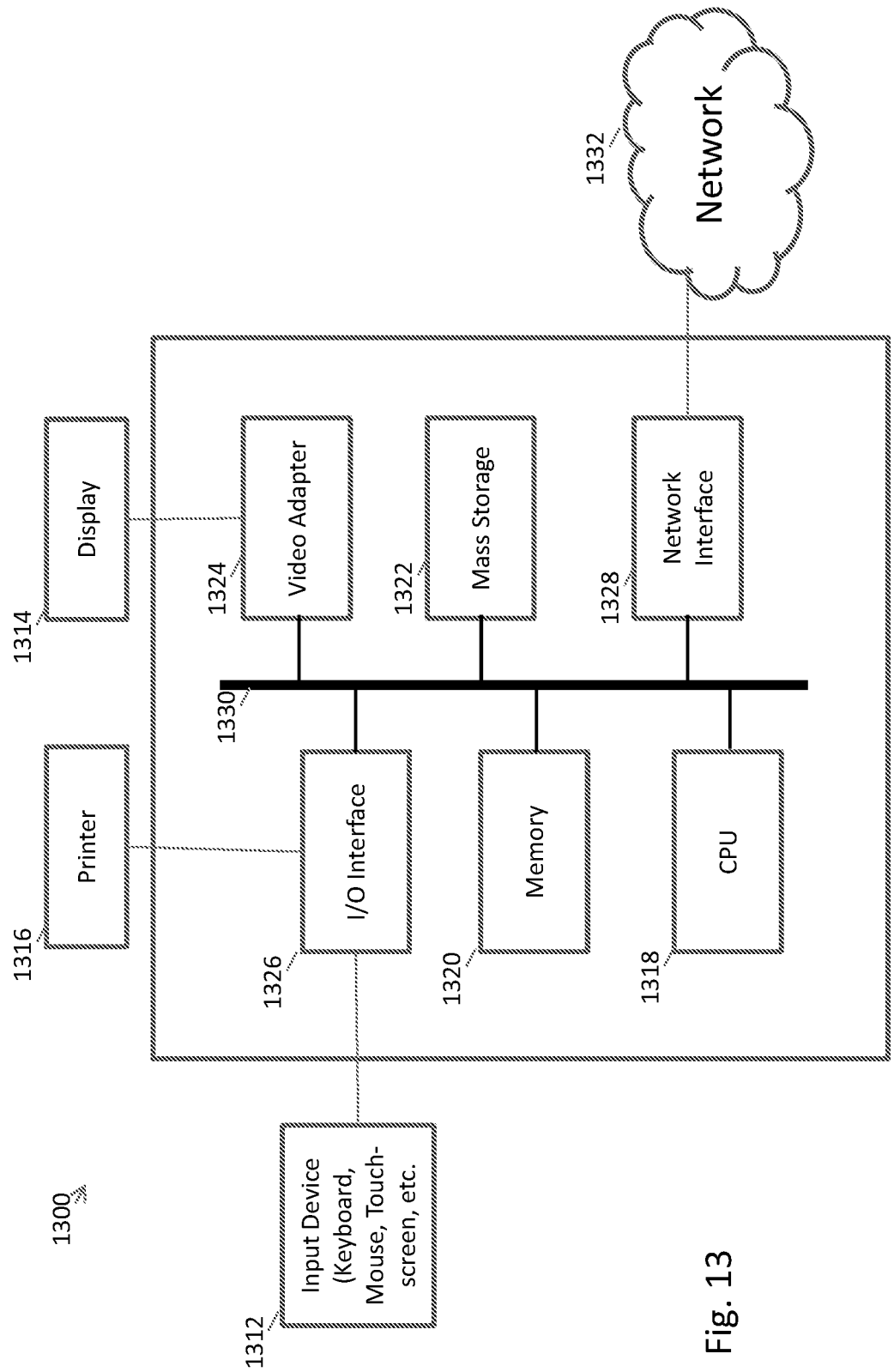
FIG. 13 is a block diagram of a desktop computing device in accordance with an embodiment of the present invention.

For example, FIG. 13 is a block diagram of a computing system 1300 that may also be used in accordance with an embodiment. It should be noted, however, that the computing system 1300 discussed herein is provided for illustrative purposes only and that other devices may be used. The computing system 1300 may comprise, for example, a desktop computer, a workstation, a laptop computer, a personal digital assistant, a dedicated unit customized for a particular application, or the like. Accordingly, the components of the computing system 1300 disclosed herein are for illustrative purposes only and other embodiments of the present invention may include additional or fewer components.

In an embodiment, the computing system 1300 comprises a processing unit 1310 equipped with one or more input devices 1312 (e.g., a mouse, a keyboard, or the like), and one or more output devices, such as a display 1314, a printer 1316, or the like. Preferably, the processing unit 1310 includes a central processing unit (CPU) 1318, memory 1320, a mass storage device 1322, a video adapter 1324, an I/O interface 1326, and a network interface 1328 connected to a bus 1330. The bus 1330 may be one or more of any type of several bus architectures including a memory bus or memory controller, a peripheral bus, video bus, or the like. The CPU 1318 may comprise any type of electronic data processor. For example, the CPU 1318 may comprise a processor (e.g., single core or multi-core) from Intel Corp. or Advanced Micro Devices, Inc., a Reduced Instruction Set Computer (RISC), an Application-Specific Integrated Circuit (ASIC), or the like. The memory 1320 may comprise any type of system memory such as static random access memory (SRAM), dynamic random access memory (DRAM), synchronous DRAM (SDRAM), read-only memory (ROM), a combination thereof, or the like. In an embodiment, the memory 1320 may include ROM for use at boot-up, and DRAM for data storage for use while executing programs. The memory 1320 may include one of more non-transitory memories.

The mass storage device 1322 may comprise any type of storage device configured to store data, programs, and other information and to make the data, programs, and other information accessible via the bus 1328. In an embodiment, the mass storage device 1322 is configured to store the program to be executed by the CPU 1318. The mass storage device 1322 may comprise, for example, one or more of a hard disk drive, a magnetic disk drive, an optical disk drive, or the like. The mass storage device 1322 may include one or more non-transitory memories.

The video adapter 1324 and the I/O interface 1326 provide interfaces to couple external input and output devices to the processing unit 1310. As illustrated in FIG. 13, examples of input and output devices include the display 1314 coupled to the video adapter 1324 and the mouse/keyboard 1312 and the printer 1316 coupled to the I/O interface 1326. Other devices may be coupled to the processing unit 1310.

The network interface 1328, which may be a wired link and/or a wireless link, allows the processing unit 1310 to communicate with remote units via the network 1332. In an embodiment, the processing unit 1310 is coupled to a local-area network or a wide-area network to provide communications to remote devices, such as other processing units, the Internet, remote storage facilities, or the like It should be noted that the computing system 1300 may include other components. For example, the computing system 1300 may include power supplies, cables, a motherboard, removable storage media, cases, a network interface, and the like. These other components, although not shown, are considered part of the computing system 1300. Furthermore, it should be noted that any one of the components of the computing system 1300 may include multiple components. For example, the CPU 1318 may comprise multiple processors, the display 1314 may comprise multiple displays, and/or the like. As another example, the computing system 1300 may include multiple computing systems directly coupled and/or networked.

Additionally, one or more of the components may be remotely located. For example, the display may be remotely located from the processing unit. In this embodiment, display information, e.g., locations and/or types of abnormalities, may be transmitted via the network interface to a display unit or a remote processing unit having a display coupled thereto.

Although several embodiments and alternative implementations have been described, many other modifications and implementation techniques will be apparent to those skilled in the art upon reading this disclosure. Various parameters and thresholds exist and can be varied for a given implementation with given data characteristics, with experimentation and ultimate performance versus computation time tradeoffs necessary to arrive at a desired operating point. Although at least one specific method has been described for calculation of each feature type, many alternate methods and feature definitions exist for calculating similar features with similar or acceptable performance. Preferred embodiments use a PDF-classification implementation with the feature set. It is believed that the disclosed feature set can also be advantageous in CAD systems not using a PDF-classification approach. Likewise, the breast coordinate system described herein, or variants thereof, are believed to have applicability in other CAD approaches.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method for processing an image comprising pixels, the method comprising:
   identifying anomalies in the image at a first anomaly size scale, comprising:
      subsampling a digital image by a subsample factor related to the first anomaly size scale, thereby generating a subsampled image having a lower resolution than the digital image in accordance with the subsample factor;
      smoothing the subsampled image to generate a smoothed image;
      determining a least-positive negated-second derivative for each pixel in the smoothed image;
      determining each pixel having a convex down curvature based on a least-positive negated-second derivative value for the respective pixel;
      joining each eight-neighbor connected pixels having convex down curvature to identify each initial anomaly area having only the first anomaly size scale, wherein, for each initial anomaly area, an internal pixel of the respective initial anomaly area represents a point of least curvature for the respective initial anomaly area;
      selecting one or more of the initial anomaly areas having only the first anomaly size scale and having strongest convex down curvatures based on a respective maximum least-positive negated-second derivative value at the respective internal pixel for each of the initial anomaly areas;
      extracting one or more classification features for each selected anomaly area having only the first anomaly size scale; and
      classifying the selected anomaly areas having only the first anomaly size scale based on the extracted one or more classification features; and
   performing the identifying the anomalies in the image for a plurality of different anomaly size scales.

2. The method of claim 1, wherein the image is a mammogram, the anomalies are potentially-malignant masses, and the one or more classification features are selected from the group consisting of: search width index, nipple distance and y position, signal-to-noise ratio (SNR), object rank, relative arc length, dip SNR, global SNR, other side SNR, and combinations thereof.

3. The method of claim 1, further comprising, before subsampling, removing bright areas from the digital image.

4. The method of claim 3, further comprising, after removing the bright areas and before subsampling, flattening an intensity of the digital image.

5. The method of claim 1, wherein determining the least-positive negated-second derivative for each pixel comprises:
   calculating second derivatives at three image points centered at each pixel and linearly spaced at a large scale; and
   repeating calculating second derivatives for a plurality of orientations around the each pixel.

6. The method of claim 1, further comprising building a noise map of the smoothed image by:
   calculating second derivatives at three image points centered at each pixel and linearly spaced at a fine scale;
   repeating calculating second derivatives for a plurality of orientations around the each pixel; and
   using a minimum absolute second derivative from the plurality of orientations as a noise map value for the each pixel.

7. The method of claim 1, further comprising, after joining and before selecting, eroding and dilating each initial anomaly area.

8. The method of claim 1, further comprising, before extracting, refining a boundary of each selected initial anomaly area.

9. A system for identifying anomalies in an image comprising pixels, the system comprising:
   an image subsampler subsampling a digital image using a subsample factor related to a first anomaly size scale, generating a subsampled image having a lower resolution than the digital image in accordance with the subsample factor;
   an image smoother smoothing the subsampled image, generating a smoothed image;
   a curvature signature detector:
      determining a least-positive negated-second derivative for each pixel in the smoothed image,
      detecting convex down curvature based on a least-positive negated-second derivative value for each pixel in the smoothed image, and
      detecting and joining neighboring convex down curvatures in the smoothed image to generate anomaly areas having only the first anomaly size scale, wherein, for each anomaly area, an internal pixel of the respective anomaly area represents a point of least curvature for the respective anomaly area;
   an anomaly selector selecting one or more of the anomaly areas having only the first anomaly size scale and having strongest convex down curvatures based on a respective maximum least-positive negated-second derivative value at the respective internal pixel for each of the anomaly areas;
   a feature extractor extracting one or more classification features for each of the selected anomaly areas having only the first anomaly size scale; and
   a classifier classifying the selected anomaly areas having only the first anomaly size scale based on one or more thresholds for the extracted one or more classification features,
   wherein the image subsampler, the image smoother, the curvature signature detector, the anomaly selector, the feature extractor and the classifier perform their respective functions for the image for a plurality of different anomaly size scales.

10. The system of claim 9, wherein the image is a mammogram, the anomalies are potentially-malignant masses, and the one or more classification features are selected from the group consisting of: search width index, nipple distance and y position, signal-to-noise ratio (SNR), object rank, relative arc length, dip SNR, global SNR, other side SNR, and combinations thereof.

11. The system of claim 9, further comprising the system removing bright areas from the digital image, before the image subsampler subsampling the digital image.

12. The system of claim 11, further comprising the system flattening an intensity of the digital image, after the bright areas are removed and before the image subsampler subsampling the digital image.

13. The system of claim 9, wherein the curvature detector determining the least-positive negated-second derivative for each pixel comprises the curvature detector:
    calculating second derivatives at three image points centered at each pixel and linearly spaced at a large scale; and
    repeating calculating second derivatives for a plurality of orientations around the each pixel.

14. The system of claim 9, further comprising the system building a noise map of the smoothed image by:
    calculating second derivatives at three image points centered at each pixel and linearly spaced at a fine scale;
    repeating calculating second derivatives for a plurality of orientations around the each pixel; and
    using a minimum absolute second derivative from the plurality of orientations as a noise map value for the each pixel.

15. The system of claim 9, further comprising the system eroding and dilating each initial anomaly area, after the curvature signature detector joining and before the anomaly selector selecting.

16. The system of claim 9, further comprising the system refining a boundary of each selected initial anomaly area, before the feature extractor extracting.

17. A computer program product for processing an image, the computer program product having a non-transitory computer-readable medium with a computer program embodied thereon, the computer program comprising:
    computer program code for identifying anomalies in the image at a first anomaly size scale, comprising:
        computer program code for subsampling a digital image by a subsample factor related to a first anomaly size scale, thereby generating a subsampled image having a lower resolution than the digital image in accordance with the subsample factor;
        computer program code for smoothing the subsampled image to generate a smoothed image;
        computer program code for determining a least-positive negated-second derivative for each pixel in the smoothed image;
        computer program code for determining each pixel having a convex down curvature based on a least-positive second derivative value for the respective pixel;
        computer program code for joining each eight-neighbor connected pixels having convex down curvature to identify each initial anomaly area having only the first anomaly size scale, wherein, for each initial anomaly area, an internal pixel of the respective initial anomaly area represents a point of least curvature for the respective initial anomaly area;
        computer program code for selecting one or more of the initial anomaly areas having only the first anomaly size scale and having strongest convex down curvatures based on a respective maximum least-positive negated-second derivative value for each of the initial anomaly areas;
        computer program code for extracting one or more classification features for each selected anomaly area having only the first anomaly size scale; and
        computer program code for classifying the selected anomaly areas having only the first anomaly size scale based on the extracted one or more classification features; and
    computer program code for performing the identifying the anomalies in the image for a plurality of different anomaly size scales.

18. The computer program product of claim 17, wherein the image is a mammogram, the anomalies are potentially-malignant masses, and the one or more classification features are selected from the group consisting of: search width index, nipple distance and y position, signal-to-noise ratio (SNR), object rank, relative arc length, dip SNR, global SNR, other side SNR, and combinations thereof.

19. The computer program product of claim 17, further comprising computer program code for removing bright areas from the digital image prior to subsampling.

20. The computer program product of claim 17, wherein the computer program code for determining the least positive negated-second derivative for each pixel comprises:
    computer program code for calculating second derivatives at three image points centered at each pixel and linearly spaced at a large scale; and
    computer program code for repeating calculating second derivatives for a plurality of orientations around the each pixel.

21. The computer program product of claim 19, further comprising computer program code for flattening an intensity of the digital image after removing the bright areas and before subsampling.

22. The computer program product of claim 17, further comprising computer program code for building a noise map of the smoothed image, comprising:
    computer program code for calculating second derivatives at three image points centered at each pixel and linearly spaced at a fine scale;
    computer program code for repeating calculating second derivatives for a plurality of orientations around the each pixel; and
    computer program code for using a minimum absolute second derivative from the plurality of orientations as a noise map value for the each pixel.

23. The computer program product of claim 17, further comprising computer program code for eroding and dilating each initial anomaly area after joining and before selecting.

24. The computer program product of claim 17, further comprising computer program code for refining a boundary of each selected initial anomaly area before extracting.

* * * * *